United States Patent [19]

Eads et al.

[11] 4,452,468
[45] Jun. 5, 1984

[54] CART WITH MOLDED BAG SUPPORTING STRUCTURES

[75] Inventors: Harold O. Eads, Parkersburg, W. Va.; Ronald R. Fowler, Coolville, Ohio; Danny C. Adams, Parkersburg, WV

[73] Assignee: O. Ames Co., Parkersburg, W. Va.

[21] Appl. No.: 416,064

[22] Filed: Sep. 8, 1982

[51] Int. Cl.³ .......................... B62B 1/04; B62B 1/06; B62B 1/26

[52] U.S. Cl. .................... 280/641; 248/98; 280/47.19; 280/47.28; 280/47.29; 280/654

[58] Field of Search ............... 280/47.27, 47.28, 47.29, 280/47.24, 47.35, 43.1, 79.1 A, 641, 645, 654, 655, 652, 47.19; 248/98, 129

[56] References Cited

U.S. PATENT DOCUMENTS

| | | | |
|---|---|---|---|
| 1,216,941 | 2/1917 | Camp | 248/99 |
| 2,725,153 | 11/1955 | Rachman et al. | 214/383 |
| 2,798,651 | 7/1957 | Wasyluk | 280/47.19 |
| 2,950,925 | 8/1960 | Larson | 280/47.19 |
| 3,041,026 | 6/1962 | Wilson | 248/98 |
| 3,754,771 | 8/1973 | Shagoury | 280/36 |
| 3,845,968 | 11/1974 | Larson | 248/98 |
| 3,992,034 | 11/1976 | Smith | 280/654 |
| 3,998,476 | 12/1976 | Kazmark | 280/655 |
| 4,124,185 | 11/1978 | Preisinger | 248/98 |
| 4,202,521 | 5/1980 | Harding | 248/98 |

Primary Examiner—Joseph F. Peters, Jr.
Assistant Examiner—Joseph McCarthy
Attorney, Agent, or Firm—Cushman, Darby & Cushman

[57] ABSTRACT

A cart for supporting a flexible plastic bag having an open mouth through which the interior may be filled with leaves or the like. The cart comprises an upright tubular frame structure defining a transversely extending manually engageable handle on the upper portion thereof, a pair of wheels, an axle mounting the wheels on the lower leg sections of the frame structure in transversely spaced relation for rotation about a transversely extending axis of rotation, a platform molded as a unitary plastic structure consisting essentially of a pair of wheel fender walls, a rear wall and a rimmed platform wall mounted for pivotal movement about the axle between an extended bag bottom supporting position and a collapsed storage position and an open bag mouth support molded as a unitary plastic structure consisting essentially of a hoop, a pair of transversely open C-shaped tube gripping elements and a pair of handle engaging hook elements mounted on the upper tubular leg sections and handle of the frame structure for movement between an extended open bag mouth supporting position and a collapsed storage position.

16 Claims, 7 Drawing Figures

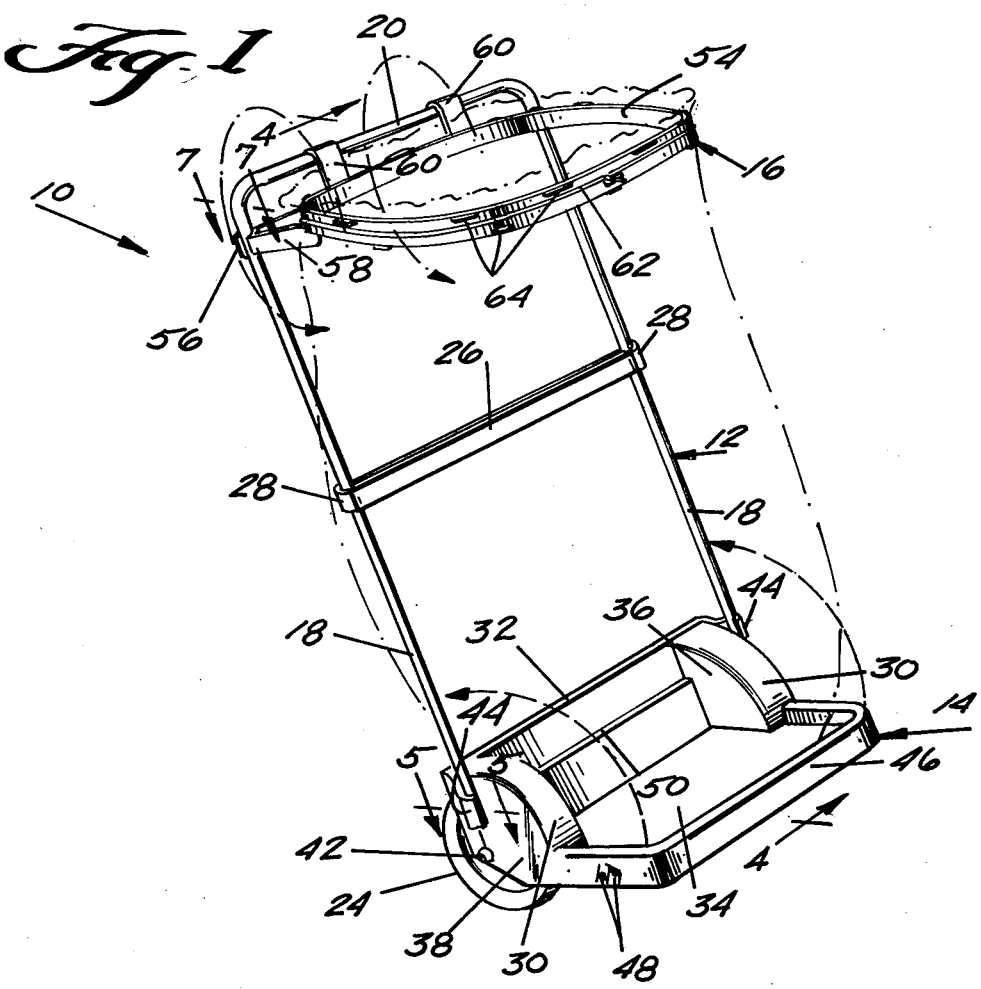
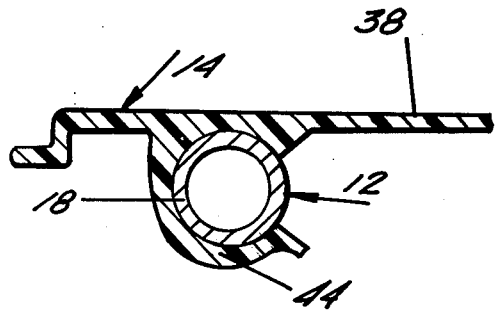
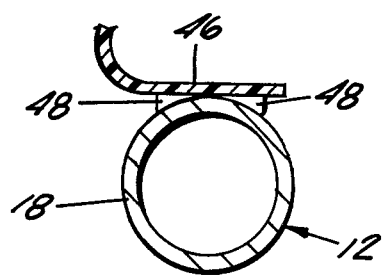
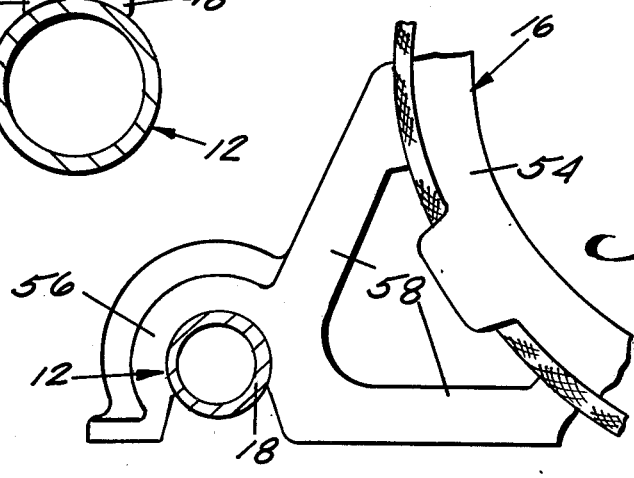

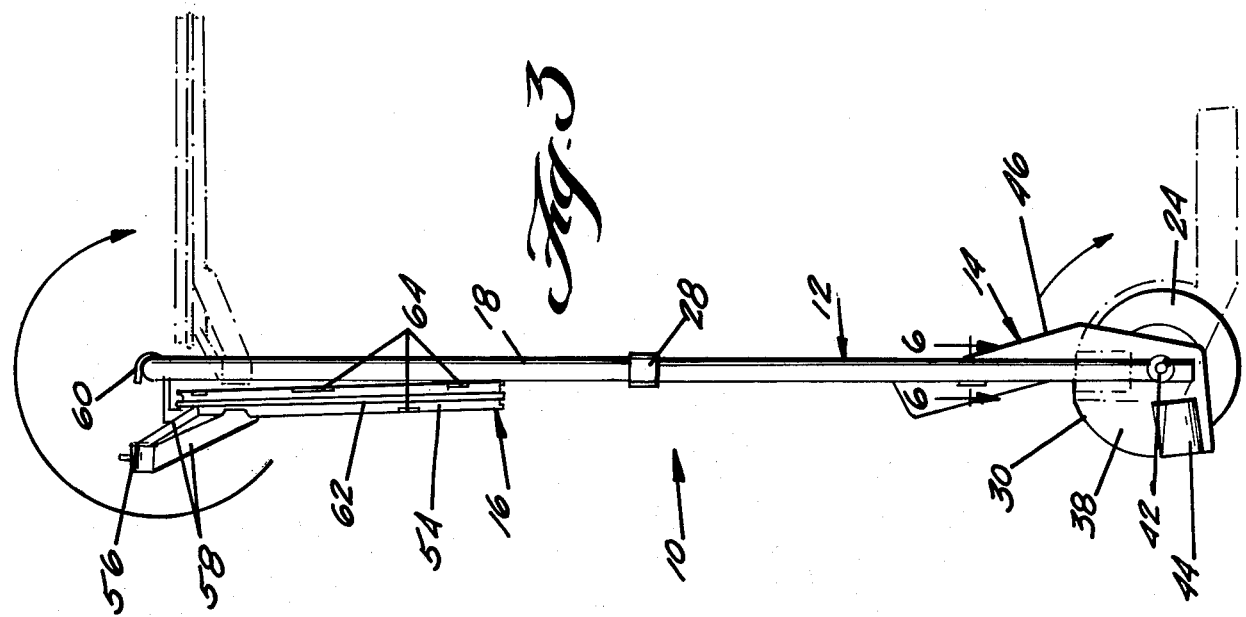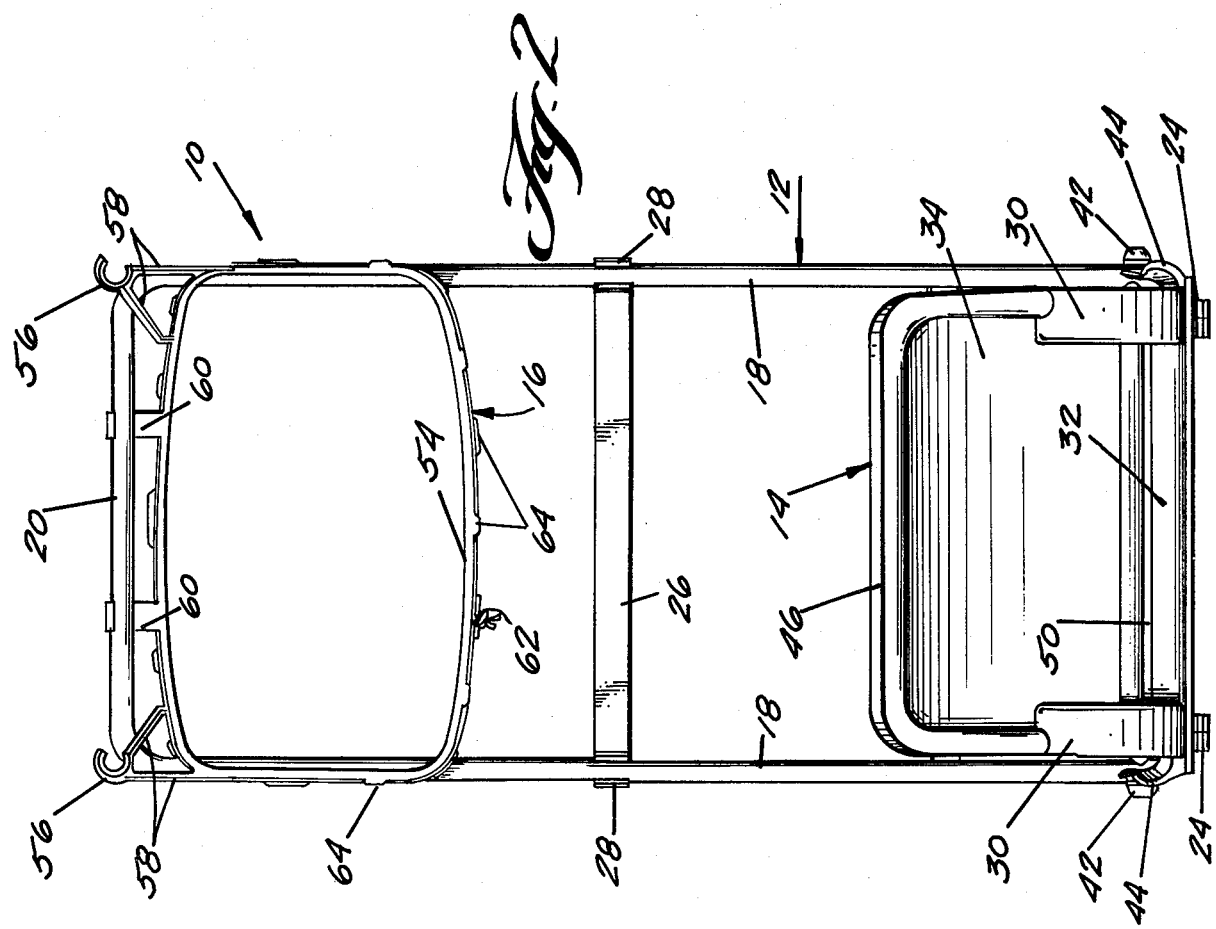

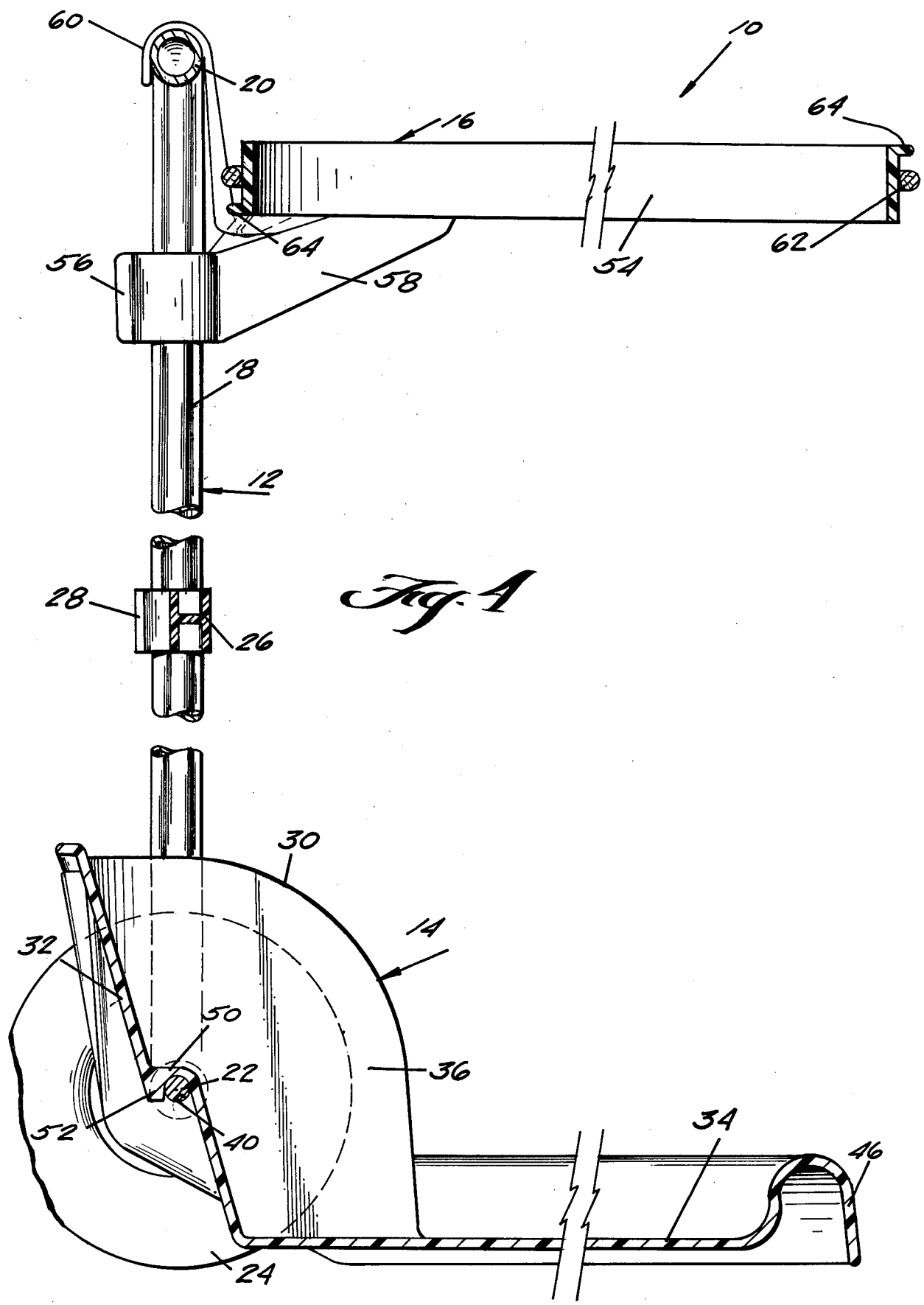

CART WITH MOLDED BAG SUPPORTING STRUCTURES

This invention relates to portable carrying devices and more particularly to such devices in the form of wheeled carts for supporting a flexible plastic bag having an open mouth through which the interior may be filled with leaves or the like.

Carts of the type herein contemplated have been provided in the patented literature for many years, examples of early patents disclosing arrangements of this type include U.S. Pat. Nos. 1,216,941; 2,725,153; and 3,041,026.

In the more recent patents, carts of this type have been proposed in which the structures provided for supporting the bag are connected to the upright wheeled frame structure either for movement or disconnected disposition between an extended bag supporting position and a collapsed storage position, see for example, U.S. Pat. Nos. 3,754,771; 3,992,034; 4,124,185; and 4,202,521.

Heretofore the bag supporting structures of carts of this type have been formed of tubular or strap metal with a construction similar to that embodied in the upright wheeled frame structure. While these all-metal carts provide adequate service, there is always a need for a cart which embodies a lighter weight construction which retains a substantial degree of strength and is capable of being more economically produced.

It is an object of the present invention to provide improvements in a cart construction of the type described which will provide these desirable characteristics. In accordance with the principles of the present invention, this objective is obtained by forming the bag supporting structures of the cart of a molded plastic material. In the case of the platform structure connected to the lower end of the upright wheeled frame structure for supporting the bottom of the bag, the plastic molding includes a pair of wheel fender walls which extend over the forward and upper peripheries of the wheels and rearwardly and downwardly over both sides of the wheels when the platform structure is disposed in its bag supporting position, a rear wall extending in an upright position transversely between the fender walls when the platform structure is disposed in its bag supporting position and a platform wall extending forwardly from the lower portion of the fender walls and the rear wall when the platform structure is disposed in its bag supporting position. This construction is particularly efficient when the cart is used for its primary purpose, namely, to support the bottom of a flexible plastic bag which is filled with leaves or the like through the open mouth. The construction formed by the integral walls as aforesaid provides strength with minimal wall thickness and permits concentration of the bag supporting platform close to the wheels, while at the same time, positively insuring that the bag cannot be contacted by the wheels and ripped open thereby.

Preferably, the molded platform structure of the present invention is pivoted to the tubular frame structure for movement between its bag supporting and storage positions by the simple expedient of passing the shaft upon which the wheels are journaled both through the fender walls of the platform structure and the lower ends of the tubular leg sections of the frame structure. The molded platform structure is releasably retained in its bag supporting position by the provision of integral C-shaped elements on the transversely outward portions of the fender walls disposed in a position to engage over the adjacent rearward portion of the associated tubular leg sections of the upright frame structure when the platform structure is in its bag supporting position and to releasably retain the same therein. The platform wall is provided with a reinforcing rim of inverted U-shaped cross-sectional configuration, the transversely outward portions of which have projections to engage over the adjacent transversely inward portions of the associated tubular leg sections of the upright frame structure when the platform structure is in its collapsed storage position to releasably retain the same therein.

In the case of the open bag mouth supporting structure connected to the upper end of the upright wheeled frame structure for supporting the open bag mouth, the plastic molding includes a hoop within and over which the open bag mouth is secured while in a horizontal position when the open bag mouth supporting structure is in its open bag mouth supporting position. A pair of C-shaped tube gripping elements are integrally fixed in transversely spaced relation along the rearward portion of the hoop, which C-shaped elements are open transversely in the same direction so as to grip the leg sections at positions adjacent the handle in response to a transverse movement of the hoop with respect to the leg sections in the one direction and to release the grip in response to an opposite transverse relative movement. One or more handle engaging hook elements are integrally fixed on the rearward portion of the hoop between the C-shaped portions which hook elements engage the handle and prevent downward movement of the hoop when in its horizontal position with the C-shaped elements gripping the leg sections. The hook elements also serve to support the hoop in a vertical position below the handle when the open bag mouth supporting structure is in its storage position.

Another object of the present invention is the provision of a cart of the type described which is simple in construction, effective in operation and economical to manufacture.

These and other objects of the present invention will become more apparent during the course of the following detailed description and appended claims.

The invention may best be understood with reference to the accompanying drawings, wherein an illustrative embodiment is shown.

In the drawings:

FIG. 1 is a perspective view of a cart embodying the principles of the present invention illustrating the same in its bag supporting position with the bag being shown in phantom lines;

FIG. 2 is a front elevational view of the cart shown in FIG. 1 with the bag supporting structures shown in their collapsed storage position;

FIG. 3 is a side elevational view of the cart showing the bag supporting structures in solid lines in their collapsed storage position and in phantom lines in their extended bag supporting positions;

FIG. 4 is an enlarged fragmentary sectional view taken along the line 4—4 of FIG. 1;

FIG. 5 is an enlarged fragmentary sectional view taken along the line 5—5 of FIG. 1;

FIG. 6 is an enlarged fragmentary sectional view taken along the line 6—6 of FIG. 3; and FIG. 7 is an enlarged fragmentary sectional view taken along the line 7—7 of FIG. 1.

Referring now more particularly to the drawings, there is shown in FIGS. 1-4 thereof a cart, generally indicated at 10, which embodies the principles of the present invention. The cart 10 includes in general an upright tubular wheeled frame structure, generally indicated at 12, a platform structure 14 mounted on the lower portion of the wheeled frame structure 12 for pivotal movement between an extended bag supporting position, as shown in FIGS. 1 and 4, and a collapsed storage position, as shown in FIGS. 2 and 3, and an open bag mouth supporting structure, generally indicated at 16, mounted on the upper portion of the upright wheeled frame structure 12 for movement between an extended open bag mouth supporting position, as shown in FIGS. 1 and 4, and a collapsed storage position, as shown in FIGS. 2 and 3.

The frame structure 12 is preferably formed of an elongated tube, preferably of metal, bent into an inverted U-shaped configuration so as to provide a pair of upright leg sections 18 integrally interconnected at their upper ends with a transversely horizontally extending bight section defining a handle 20. The lower free ends of the leg sections 18 are apertured to receive the ends of a transversely extending axle or wheel shaft 22 (see FIG. 4). The upright wheeled frame structure 12 also includes a pair of wheels 24 journaled on opposite end portions of the shaft 22.

The frame structure 12 may also include an intermediate brace 26 which preferably is molded of plastic material, such as polypropylene or the like, to have a generally H-shaped cross-sectional configuration substantially throughout its length. Formed on opposite ends of the brace 26 are rearwardly opening C-shaped gripping elements 28. The interior of the C of these gripping elements is configured to engage over and grip the forward intermediate portion of the tubular leg sections 18. The C extends arcuately a distance of approximately 270° so as to require a snapping action into gripping engagement with the tubular leg section whereby the ends of the brace are firmly gripped onto the leg sections. It will be understood, however, that the brace is capable of being moved along the longitudinal extent of the leg sections.

The platform structure 14 is preferably of a unitary construction molded of a plastic material, such as polypropylene or other similar material. The platform structure consists essentially of two fender walls 30, a rear wall 32 and a platform wall 34. Each fender wall extends over the upper and forward periphery of an associated wheel 24 and downwardly and rearwardly over both sides of the associated wheel when the platform structure is in its extended position. Each fender wall 30 includes inner and outer side wall portions 36 and 38 which are apertured, as indicated at 40 in FIG. 4, to receive the associated end portion of the wheel shaft 22 therethrough. The outer extremities of the wheel shaft 22 are capped, as indicated at 42, to retain the same in assembled position. It will be noted that by virtue of the engagement of the wheel shaft 22 through the openings 40, the platform structure 14 is mounted for pivotal movement with respect to the frame structure 12 between the extended bag supporting position and collapsed storage position thereof.

As best shown in FIG. 5, the outer side wall portion 38 of each fender wall 30 has integrally formed thereon a forwardly opening C-shaped element 44 which is of a construction similar to the C-shaped element 28 of the brace 26. The interior size of the C is such as to grippingly engage the adjacent rearward portion of the tubular leg sections 18 while the arcuate extent of the C is approximately 270° so as to grip the pipe sections with a snap action in response to the movement of the platform structure into its extended bag supporting position. In this regard it will be noted that the surface defining the forward open extent of the C-shaped elements 44 tapers inwardly toward the interior of the C-shaped elements so as to materially aid in the snap gripping action of the C-shaped elements in response to the aforesaid relative movement. Likewise, each C-shaped element 44 will yield and release the grip on the associated leg section 18 when the platform structure 14 is moved in the opposite direction out of the bag supporting position, shown in FIGS. 1 and 4, toward the collapsed storage position, shown in FIGS. 2 and 3.

The platform wall 34 is formed with an integral peripheral rim portion 46 which is preferably of inverted U-shaped cross-sectional configuration. The transversely outer portions of the inverted U-shaped rim 46 are formed with integral projections 48 which serve to engage the transversely inner portions of the tubular leg sections 18 as shown in FIG. 6 when the platform structure 14 is moved into its collapsed storage position, as shown in FIGS. 2 and 3, so as to releasably retain the same therein. It will be noted that the adjacent wall portion of the rim will deflect sufficient to enable the projections to be engaged with the tubular leg portions 18 and to be released therefrom.

The rear wall 32 which extends transversely between the inner side wall portions 36 of the fender walls 30 includes an intermediate step portion 50 therein which engages over and in front of the central portion of the wheel shaft 22 when the platform structure is in its extended bag supporting position. As shown in FIG. 4, an integral centrally located lug 52 is formed on the rearward central portion of the step 50 to insure retention of the step in engagement with the shaft. In this way the shaft serves to strengthen and support the central portion of the rear wall 32.

The open bag mouth supporting structure 16 is, like the platform structure 14, preferably molded in a unitary construction from a plastic material, as for example, polypropylene. The structure 16 consists essentially of a hoop 54 having a pair of C-shaped elements 56 mounted, as by integral mounting arms 58, in transversely spaced relation along the rearward portion of the hoop 54 and a pair of handle engaging hook-shaped elements 60 formed integrally on the lower rearward portion of the hoop between the C-shaped elements 56. The C-shaped elements 56 are similar in configuration to the elements 28 and 44 previously described and both open transversely in the same direction so as to be moved into gripping engagement with the tubular leg sections 18 at positions adjacent the handle 20 in response to a transverse movement of the hoop in the open direction while the hoop is disposed in an extended horizontal position. As before, the C-shaped elements 56 are releasable from gripping engagement with the tubular leg sections 18 in response to a movement of the hoop 54 transversely in the opposite direction. The hook-shaped elements 60 open downwardly when the hoop 54 is disposed in its extended horizontal position and engages the handle 20 so as to prevent downward movement of the hoop 54 when the C-shaped elements 56 are in gripping engagement with the leg sections 18.

It will be noted that the integral connections of the hook elements 60 and mounting arms 58 of the C-shaped elements 56 with the hoop 54 are along the lower surface thereof when the hoop is disposed in its extended horizontal position, thus providing access to the exterior periphery of the hoop from above throughout so as to permit the open mouth of a plastic bag to be extended through the hoop and over the same. In order to retain the open bag mouth in this position an elastic band 62 is provided. The band 62 is retained on the exterior periphery of the hoop 54 by a multiplicity of annularly spaced integral projections 64 extending outwardly from the upper and lower edges of the hoop in staggered relation with respect to one another.

FIG. 1 illustrates the manner in which the cart 10 is used to support a plastic bag so that the interior can be filled through its open mouth with leaves or the like. As shown, the open mouth extends through the horizontally positioned hoop 54 and upwardly and over the exterior periphery thereof where it is retained by the elastic band 62. The bottom of the plastic bag rests upon the platform structure 14 with the fender walls 30 and rear wall 32 thereof serving with the platform wall 34 to support the bag bottom and to positively prevent the same from contacting the axle 22 and wheels 24. The arrangement is particularly efficient in that the weight of the contents of the bag can be concentrated near the wheels without danger of tearing the bag through contact with the wheels. As the bag is filled it tends to bulge outwardly and this bulging action tends to apply more downward force on the hoop 54 supporting the upper open mouth of the bag. It will be noted, however, that any downward pull exerted by the bag on the hoop is resisted by the engagement of the C-shaped elements 56 with the leg sections 18 of the frame structure. The engagement of hook element 60 with handle 20 also aids in supporting the hoop against downward movement when they are so engaged.

The gripping action of the C-shaped elements 56 on the leg sections 18 is such as to provide the entire support for the open upper end of the bag. Indeed, an important feature of the functioning of the C-shaped elements 56 is that the hoop is supported in any position of vertical adjustment along the length of the leg sections 18 so as to accommodate bags of different size. This adjustment can be readily accomplished manually by simply manually engaging the C-shaped elements and moving them along the length of the leg sections. The gripping action is such that a sliding movement can be accomplished as long as the moving force is applied directly on the C-shaped elements 56 in the direction of extent of the leg sections. On the other hand, the bag load supported by the hoop is transmitted to the C-shaped elements 56 in such a way as to cause them to cant or skew rather than to slide vertically. In this regard it will be noted that brace 26 is likewise universally movable along the leg sections to accommodate bags of different size.

After the cart 10 has been used in handling and filling the plastic bags and it is desired to store the cart for use at some future time, the operator simply effects a relative counterclockwise movement, as viewed in FIG. 4, of the platform structure 14 relative to the frame structure 12 which has the effect of releasing the gripping action of the C-shaped elements 44 from the leg sections 18 and finally engaging the projections 48 therewith when the platform structure 14 has been pivoted into its collapsed vertically extending position, as shown in FIGS. 2 and 3. The hoop structure 16 is moved from its extended open bag mouth supporting position by effecting a transverse horizontal movement of the hoop structure in a direction opposite from the direction in which the C-shaped elements 56 open. This movement, which is accommodated by the hook elements 60 with respect to the handle 20, serves to disengage the C-shaped elements 56 from the leg portions 18, thus permitting the hoop 54 to be pivoted in a counterclockwise direction, as viewed in FIG. 4, about the axis of the handle with the hook elements 60 serving as the pivotal connection. After an approximately 270° pivotal movement of the hoop it will be disposed in its collapsed vertically extending position, as shown in FIGS. 2 and 3, wherein the hook elements 60 serve to suspend the hoop 54 in a position below the handle 20. It can be seen that when the cart is in the collapsed position, as shown in FIG. 3, the cart is capable of being suspended from a vertical wall in such a way as to minimize the space required to store the same. While the pivotal movement of the open bag mouth supporting structure 16 into its storage position as described above is preferred, it will be understood that the open bag mouth supporting structure could simply be totally removed from engagement with the frame and independently suspended with the forward edge of the hoop disposed alongside the frame handle.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A cart for supporting a flexible plastic bag having an open mouth through which the interior may be filled with leaves or the like, said cart comprising an upright tubular frame structure defining a transversely extending manually engageable handle on the upper portion thereof, a pair of wheels, means mounting said wheels on the lower portion of said frame structure in transversely spaced relation for rotation about a transversely extending axis of rotation, a platform structure mounted with respect to said frame structure for movement between an extended bag bottom supporting position and a collapsed storage position and an open bag mouth supporting structure mounted on the upper end portion of said frame structure for movement between an extended open bag mouth supporting position and a collapsed storage position, the improvement which comprises said platform structure being formed of a molded plastic material and including
a pair of wheel fender walls which extend over the forward and upper periphery of said wheels and rearwardly and downwardly over both sides of said wheels when said platform structure is disposed in said bag supporting position,
a rear wall extending in an upright position transversely between said fender walls when said platform structure is disposed in said bag supporting position and
a platform wall extending forwardly from the lower portion of said fender walls and said rear wall when said platform structure is disposed in said bag supporting position.

2. The improvement as defined in claim 1 wherein said frame structure includes a single metallic tube bent into an inverted U-shaped configuration to form a pair of upright leg sections interconnected at their upper ends by a bight section, said bight section defining said handle.

3. The improvement as defined in claim 2 wherein the lower free end portions of said leg sections are disposed transversely outwardly adjacent said fender walls and said wheel mounting means comprises a shaft extending transversely through the fender walls and the lower ends of said leg sections so as to pivotally mount the platform structure to the frame structure for movement between the bag supporting and storage positions thereof.

4. The improvement as defined in claim 3 wherein the transversely outward portions of said fender walls have C-shaped elements formed thereon in positions to engage over the adjacent rearward portions of the associated leg sections when said platform structure is in said bag supporting position so as to releasably retain the same therein.

5. The improvement as defined in claim 1, 2, 3 or 4 wherein the rear wall of said platform structure is formed with a central step configuration extending in supported relation over the upper and forward portion of the shaft extending transversely between said fender walls.

6. The improvement as defined in claim 1, 2, 3 or 4 wherein the platform wall of said platform structure includes a strengthening peripheral rim of inverted U-shaped cross-sectional configuration.

7. The improvement as defined in claim 6 wherein the transversely outwardly facing portions of said rim are formed with tube engaging projections for releasably engaging the adjacent transversely inward portions of said leg sections when said platform structure is in said storage position so as to releasably retain the same therein.

8. A cart as defined in claim 2, 3 or 4 wherein said open bag mouth supporting structure is formed of a molded plastic material and includes
 a hoop within and over which the open bag mouth is secured while in a horizontal position when said open bag mouth supporting structure is in said open bag mouth supporting position,
 a pair of C-shaped tube gripping elements integrally fixed in transversely spaced relation along the rearward portion of said hoop, said C-shaped elements being open transversely in the same direction so as to grip said leg sections at positions adjacent the handle in response to a transverse movement of said hoop with respect to said leg sections in said one direction to hold said hoop in said horizontal position and to release said grip in response to an opposite transverse relative movement, and
 integral handle engaging means on the rearward portion of said hoop between said C-shaped elements for engaging said handle and preventing downward movement of said hoop when in said horizontal position and said C-shaped elements grip said leg sections, said handle engaging means supporting said hoop in a vertical position below said handle when said open bag mouth supporting structure is in said storage position.

9. The improvement as defined in claim 8 wherein said handle engaging means includes a pair of transversely spaced hook-shaped elements extending upwardly from the lower surface of said hoop in rearwardly spaced relation when said open bag mouth supporting structure is in said open bag mouth supporting position.

10. The improvement as defined in claim 9 wherein said hook-shaped elements are slidable transversely along said handle so as to remain in engagement during the transverse movements of said C-shaped portions to grip and release said leg sections.

11. A cart for supporting a flexible plastic bag having an open mouth through which the interior may be filled with leaves or the like, said cart comprising an upright tubular frame structure including a pair of upright leg sections and a transversely extending manually engageable handle, a pair of wheels, means mounting said wheels on the lower portion of said leg sections in transversely spaced relation for rotation about a transversely extending axis of rotation, a platform structure mounted with respect to the lower portion of said frame structure for movement between an extended bag supporting position and a collapsed storage position and an open bag mouth supporting structure on the upper end portion of said frame structure for movement between an extended open bag mouth supporting position and a collapsed storage position, the improvement which comprises
 said open bag mouth supporting structure being formed of a molded plastic material and including
 a hoop within and over which the open bag mouth is secured while in a horizontal position when said open bag mouth supporting structure is in said open bag mouth supporting position,
 a pair of C-shaped tube gripping elements integrally fixed in transversely spaced relation along the rearward portion of said hoop, said C-shaped elements being open transversely in the same direction so as to grip said leg sections at positions adjacent the handle in response to a transverse movement of said hoop with respect to said leg sections in said one direction to hold said hoop in said horizontal position and to release said grip in response to an opposite transverse relative movement, and
 integral handle engaging means on the rearward portion of said hoop between said C-shaped elements for engaging said handle and preventing downward movement of said hoop when in said horizontal position and said C-shaped elements grip said leg sections, said handle engaging means supporting said hoop in a vertical position below said handle when said open bag mouth supporting structure is in said storage position.

12. The improvement as defined in claim 11 wherein said handle engaging means includes a pair of transversely spaced hook-shaped elements extending upwardly from the lower surface of said hoop in rearwardly spaced relation when said open bag mouth supporting structure is in said open bag mouth supporting position.

13. The improvement as defined in claim 12 wherein said hook-shaped elements are slidable transversely along said handle so as to remain in engagement during the transverse movements of said C-shaped portions to grip and release said leg sections.

14. A cart for supporting a flexible plastic bag having an open mouth through which the interior may be filled with leaves or the like, said cart comprising an upright tubular frame structure defining a transversely extending manually engageable handle on the upper portion thereof, a pair of wheels, means mounting said wheels on the lower portion of said frame structure in transversely spaced relation for rotation about a transversely extending axis of rotation, a platform structure mounted with respect to said frame structure for movement between an extended bag bottom supporting position and a collapsed storage position and an open bag mouth supporting structure mounted on the upper end portion of said frame structure for movement between an extended open bag mouth supporting position and a collapsed storage position, the improvement which comprises said platform structure including
a pair of wheel fender walls which extend over the forward and upper periphery of said wheels and rearwardly and downwardly over both sides of said wheels when said platform structure is disposed in said bag supporting position,
a rear wall extending in an upright position transversely between said fender walls when said platform structure is disposed in said bag supporting position and
a platform wall extending forwardly from the lower portion of said fender walls and said rear wall when said platform structure is disposed in said bag supporting position.

15. A cart for supporting a flexible plastic bag having an open mouth through which the interior may be filled with leaves or the like, said cart comprising an upright tubular frame structure including a pair of upright leg sections and a transversely extending manually engageable handle, a pair of wheels, means mounting said wheels on the lower portion of said leg sections in transversely spaced relation for rotation about a transversely extending axis of rotation, a platform structure mounted with respect to the lower portion of said frame structure for movement between an extended bag supporting position and a collapsed storage position and an open bag mouth supporting structure on the upper end portion of said frame structure for movement between an extended open bag mouth supporting position and a collapsed storage position, the improvement which comprises said open bag mouth supporting structure being formed of a molded plastic material and including
a hoop within and over which the open bag mouth is secured while in a horizontal position when said open bag mouth supporting structure is in said open bag mouth supporting position, and
a pair of C-shaped tube gripping elements integrally fixed in transversely spaced relation along the rearward portion of said hoop, said C-shaped elements being open transversely in the same direction so as to grip said leg sections in response to a transverse movement of said hoop with respect to said leg sections in said one direction to (1) frictionally hold said hoop in the horizontal position into which it is moved, (2) permit manual vertical sliding movement into any other horizontal position along the vertical extent of said leg sections and (3) to release said grip in response to an opposite transverse relative movement to enable said open bag mouth structure to be suspended in a vertical storage position.

16. The improvement as defined in claim 2, 3, 4, 11, 12, 13 or 15 wherein a brace is mounted in transversely extending relation between said leg sections, said brace having C-shaped tube gripping elements on the ends thereof for engaging said leg sections to frictionally hold the brace thereon and permit vertical sliding adjustment therealong.

* * * * *